United States Patent
Gandrud

[15] 3,704,816
[45] Dec. 5, 1972

[54] FEEDING ROTOR FOR DISPENSERS OF GRANULAR MATERIAL

[72] Inventor: Ebenhard S. Gandrud, P.O. Box 528, Owatonna, Minn. 55060

[22] Filed: Nov. 17, 1971

[21] Appl. No.: 199,814

Related U.S. Application Data

[63] Continuation of Ser. No. 11,406, Feb. 16, 1970, abandoned.

[52] U.S. Cl. ................................222/368, 222/406
[51] Int. Cl. ..............................................G01f 11/24
[58] Field of Search.......222/368, 410, 349, 342, 406

[56] References Cited

UNITED STATES PATENTS

| 2,723,053 | 11/1955 | Gandrud | 222/410 X |
| 2,899,111 | 10/1956 | Christensen | 222/368 X |

*Primary Examiner*—Stanley H. Tollberg

[57] ABSTRACT

A spreading machine including an elongated dispensing rotor having a rigid axial shaft and an elongated body of elastomeric material covering the shaft in axially inwardly spaced relation to the ends of the shaft, the body including a plurality of generally radial vanes extending longitudinally of the shaft, each of the vanes having opposite sides converging generally radially outwardly to define a longitudinally extending flexible feather edge.

11 Claims, 7 Drawing Figures

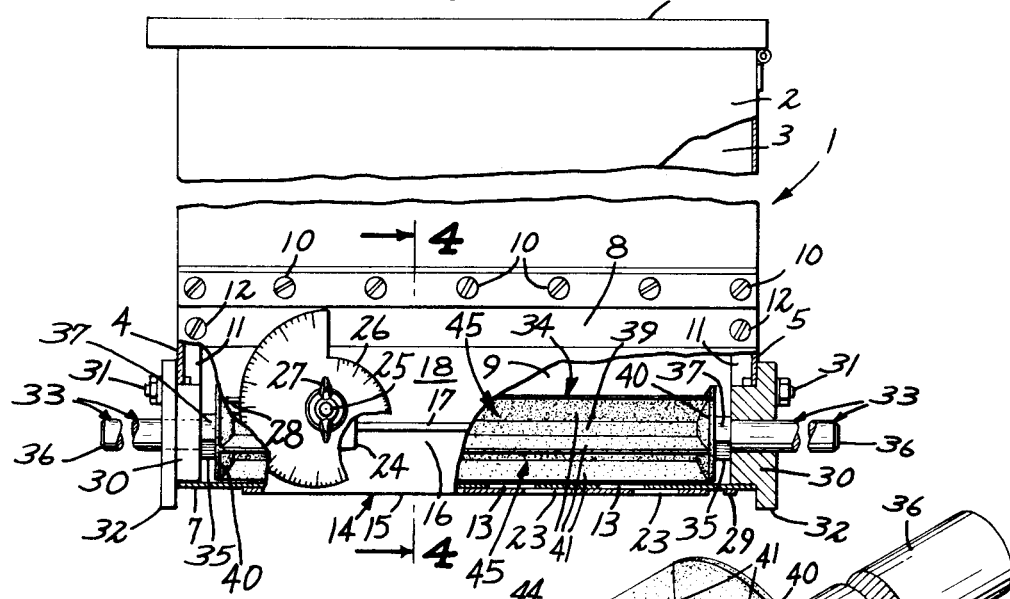
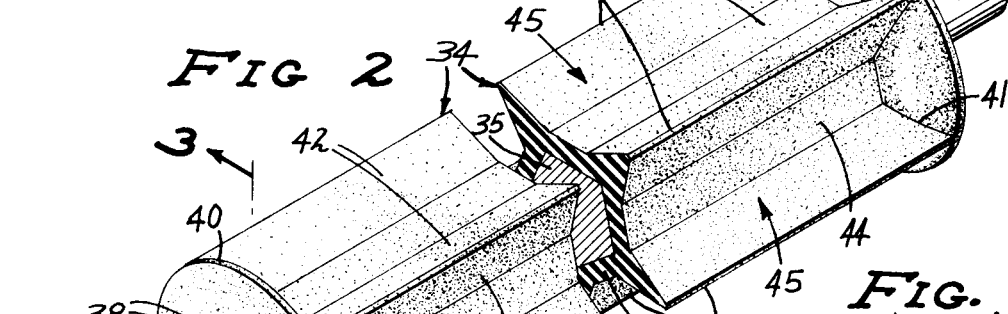
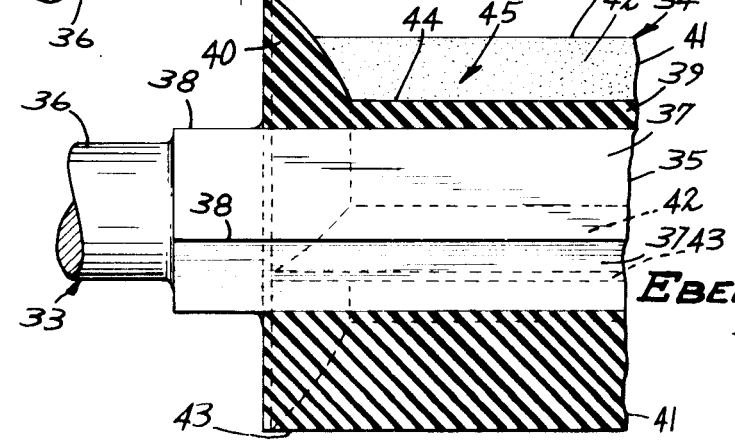
INVENTOR.
EBENHARD S. GANDRUD

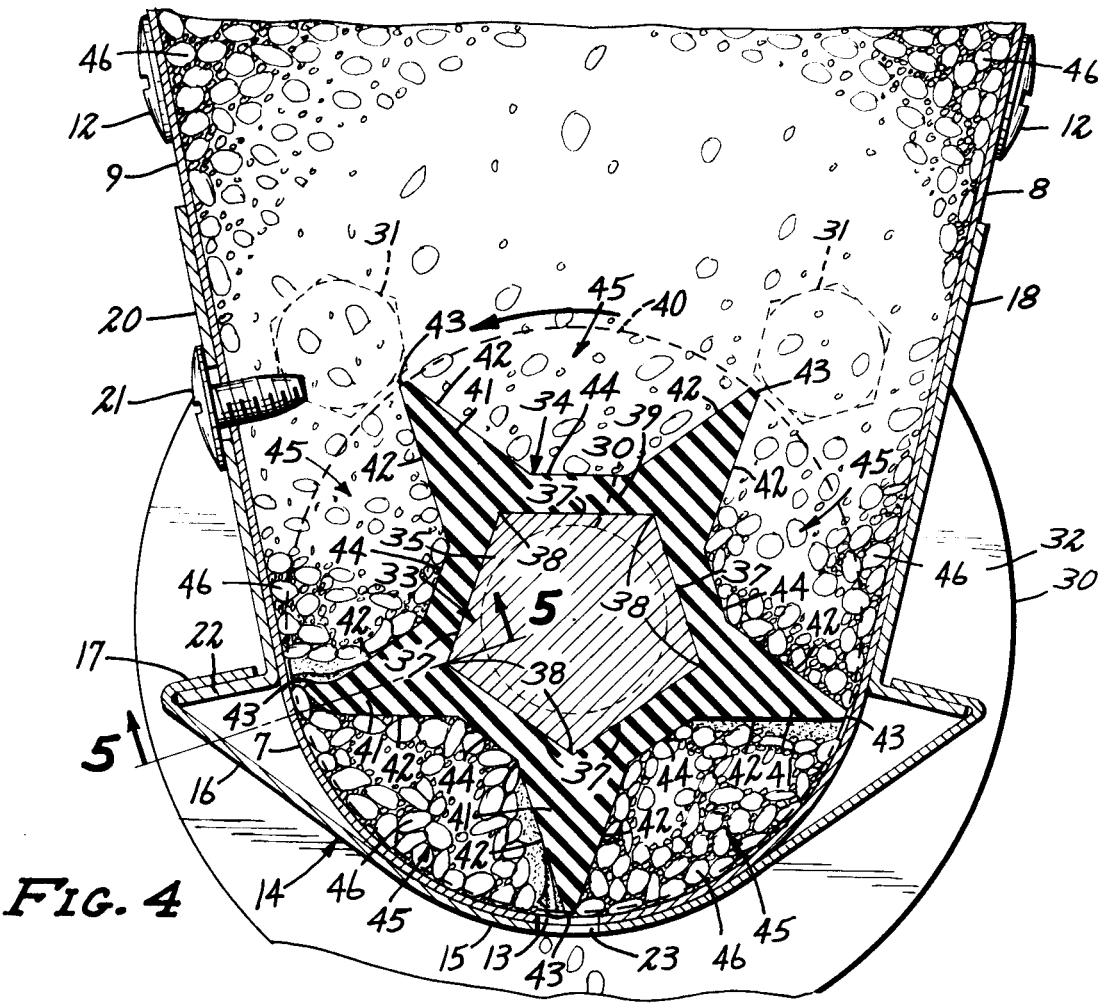
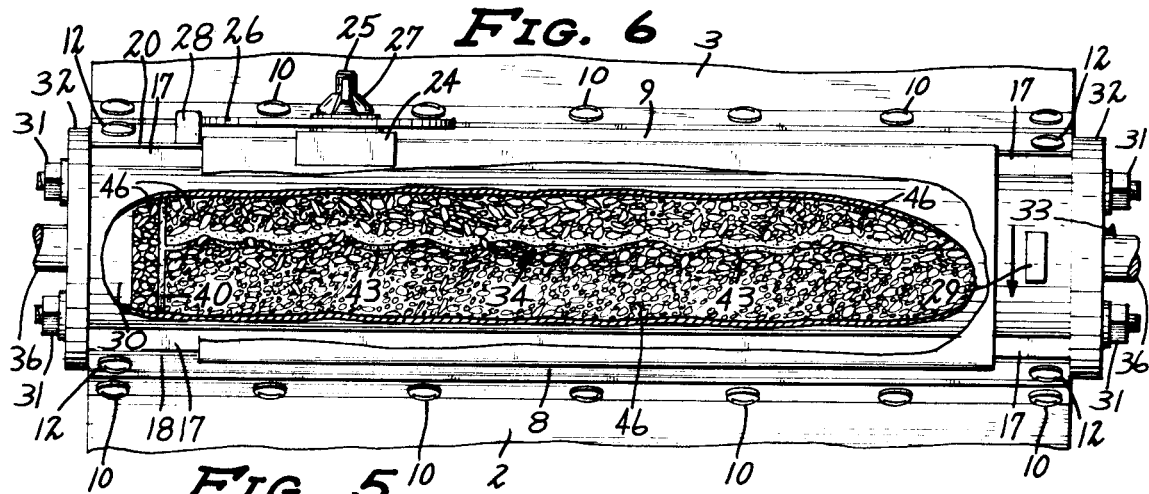

FEEDING ROTOR FOR DISPENSERS OF GRANULAR MATERIAL

This is a continuation of application Ser. No. 11,406, filed Feb. 16, 1970, now abandoned.

BACKGROUND OF THE INVENTION

This invention is in the nature of an improvement over feeding rotors of the general type disclosed in U.S. Letters Patent No. 2,475,381, and my own prior U.S. Letters Patent Nos. 2,723,053 and 2,846,125. In the distribution over the ground of granular chemicals such as fertilizer and pesticides, to promote crop growth, and for sowing of seed, feeding-type, rotor-equipped, dispensing hoppers are customarily used. These hoppers are moved over the ground, and the flow of material through paced apertures in the bottoms of the hoppers is metered for required rate of application. The feeding rotors provide for uniform feeding of material to the hopper bottom apertures. The feeding rotors usually comprise a plurality of circumferentially spaced radial vanes extending longitudinally of the rotor. The vanes normally have radially outer edges either slidingly engaging or moving in closely spaced proximity to the hopper bottom during feeding rotation of the rotor. Feeding rotors of different materials, such as metal and rubber, have been used in spreading chemical granules or seeds with varying degrees of success, depending upon the material to be dispensed.

At present, pesticide chemicals are used in granular form, or in connection with a vehicle, such as sand. When sand or similar material is used as a vehicle, the grains thereof are individually coated with the chemical to provide granules. In either form, the outer surface of each granule is dried before use, so that the granules do not adhere together, but flow freely through dispensing mechanism when applied to the soil. While, as above stated, the exterior of each granule is dry, the interiors thereof are often moist or glutinous, and fracture of the granules or the dry outer surfaces or skins thereof cause adjacent granules to adhere to each other. When used in dispensing hoppers having rotors heretofore produced with relatively thick or rigid feeding vanes, granules are easily fractured and adhere to the hopper bottom, causing a buildup of chemical material often sufficient to interfere with feeding rotation of the rotor. Further, when grains of sand or other abrasive material are used as a vehicle, as above mentioned, fracture of the dry outer portions of the granules permits the sand to come into abrading or grinding contact with the bottom portion of the hopper, resulting in undue wear of the hopper bottom. In many cases, the chemicals, when moist, have a corrosive effect on metal from which the hopper bottoms are usually made. Thus, when granules are fractured or crushed, the moist interiors thereof come into contact with the metallic rotors and hopper bottom portions and corrode the same, necessitating early replacement of the feeding rotor as well as the hopper, or at least the affected portion thereof.

Fracturing or crushing of chemical fertilizer or pesticide granules occurs when the same become lodged between the outer longitudinal edge surfaces of the rotor vanes and the hopper bottom during rotation of the feeding rotor. The outer edges of relatively sharp metallic rotor vanes cut easily through the granules, and the vanes of rotors of elastomeric material, heretofore produced, are of sufficient hardness and circumferential thickness at their radially outer edges to crush the granules caught therebetween and the hopper bottom.

The broadcast sowing of seed by rotor equipped hoppers has entailed similar difficulties. Metal dispensing rotors easily cut or fracture the seed when caught therebetween and the hopper bottom, rendering the seed useless for its intended purpose. In the case of seeds having dry interiors, attrition or grinding of the edges of the rotor vanes and of the interior surface of the hopper bottom occurs, requiring early replacement. Further, crushing of the seeds destroys or injures germination of the seed.

The rubber rotor disclosed in my prior U.S. Pat. No. 2,723,053 proved to be non-corrosive, but did not solve the problem of crushing or fracturing the more delicate seeds and chemical granules. Hence, corrosion of the hopper bottom and a buildup of material on the hopper bottom was still found to be a problem. Moreover, the earlier rubber rotor did not prove to be highly effective in sealing off the discharge apertures of the hopper bottom from the upper portion of the hopper when the rotor was stationary.

A further problem with my prior art rubber rotor was the fact that a vane when passing over a granule or group of granules created a large space around the granule or granules adversely affecting proper distribution. This large space permitted other particles to pass from one side of the vane to the other. In light of the present invention, it is now believed that this problem was caused, in part, by the longitudinal rigidity of the vanes.

Another problem involved in dispensing seeds, fertilizer or other various chemical granules in present use, is that of wear of the rotor due to friction therebetween and the granules or the hopper bottom. Yet another problem has been that of providing a long-lived rotor of sufficient softness and flexibility to avoid injury to the granules, and yet be sufficiently rigid to positively and uniformly feed seeds or other granules to the dispensing apertures of the hopper. Overcoming these problems has entailed considerable experimentation in connection with rotor design and with materials of various hardness, flexibility and resilience.

Because of the prior art problems, rubber rotors did not seem feasible for use in rotor-equipped dispensing hoppers except in very limited applications. The present invention has proved to solve these problems; and for the first time, successful rubber rotors have been produced which are a significant advance in the art.

SUMMARY OF THE INVENTION

The feeding rotor of this invention comprises an elongated rigid axial shaft and an elongated body member of elastomeric material mounted fast on the shaft concentric therewith. The body member includes a plurality of circumferentially spaced generally radial vanes extending longitudinally of the shaft. Each vane has opposite sides converging generally radially outwardly to define an outer longitudinally extending, soft, flexible resilient feather edge. The feather edge portion is sufficiently soft to be deformed closely about a granule of material caught between the vane and a cooperating hopper bottom portion, during rotation of the feeding rotor, to prevent passage of other granules from one side of the vane to the other thereof adjacent the granule caught by the vane. The vane is of a resilient stiffness however, to exert sufficient pressure upon the caught granule to carry the same in sliding engagement with the inner surface of the hopper to the dispensing openings in the hopper bottom. The vanes are circumferentially spaced apart to effectively seal off the openings in the hopper bottom from the upper portion of the hopper, to prevent loss of material from the hopper when the rotor is stationary.

DESCRIPTION OF THE DRAWings

FIG. 1 is a view in side elevation of a spreading device for granular material, including the feeding rotor of this invention, some parts being broken away and some parts being shown in section;

FIG. 2 is an enlarged fragmentary view in perspective of the feeding rotor of this invention;

FIG. 3 is a still further enlarged fragmentary section taken substantially on the line 3—3 of FIG. 2;

FIG. 4 is an enlarged fragmentary section taken on the line 4—4 of FIG. 1;

FIG. 5 is a fragmentary section taken substantially on the line 5—5 of FIG. 4;

FIG. 6 is an enlarged view in bottom plan of the structure of FIG. 1 with portions thereof broken away and some parts being shown in section; and FIG. 7 is a view in transverse section of a modified form of feeding rotor.

DETAILED DESCRIPTION

A dispensing hopper 1, shown in FIGS. 1 and 4, is of the type used in fertilizer and chemical applicators disclosed in my prior U.S. Letters Patents Nos. 2,723,053; 2,846,125 and 3,096,004. The hopper 1 comprises a pair of opposed side walls 2 and 3, opposite end walls 4 and 5, a hinged or removable cover 6, and an arcuate bottom wall 7. The bottom wall 7 is formed to provide upwardly diverging side wall portions 8 and 9 that are tangent to the arcuate bottom wall portion 7 and which are rigidly but removably secured at their upper edge portions to the side walls 2 and 3 respectively, by means of anchoring screws or the like 10. The end walls 4 and 5 are formed at their opposite side edges to provide inturned flanges 11 that are secured to opposite ends of the wall portions 8 and 9 by fastenings such as screws 12. The opposite ends of the side walls 2 and 3 are welded or otherwise permanently secured to adjacent ones of the inturned flanges 11.

The arcuate bottom wall 7 of the hopper 1 is pierced to provide a plurality of spaced apart discharge apertures 13 that are arranged in a row extending in a direction axially of the arcuate bottom wall 7. The apertures 13 may be of any desired shape but are preferably elongated in said axial direction, and generally diamond shaped, an example of such discharge apertures being shown in my earlier U.S. Pat. No. 2,852,116. A valve-acting gate plate 14 underlies the arcuate bottom wall 7, and is formed to provide a cross-sectionally arcuate intermediate portion 15 corresponding to the bottom wall 7, and upwardly diverging side portions 16 formed at their outer longitudinal edges to provide inturned flanges 17. A mounting plate 18 is welded or otherwise rigidly secured to the side wall portion 8, and is formed to provide an out-turned longitudinally extending flange 19 that underlies and supports the adjacent flange 17 of the gate plate 14, as shown in FIG. 4. A similar mounting plate 20 is removably secured to the side wall portion 9 by anchoring screws 21, one of which is shown in FIG. 4, and by means of which the plate 20 may be adjusted upwardly and downwardly relative to the wall portion 9. The mounting plate 20 includes a longitudinally extended outwardly projecting flange 22 which underlies and supports the adjacent flange 17 of the gate plate 14.

The gate plate 14 is longitudinally slidably movable relative to the arcuate bottom wall 7 and, like the bottom wall 7, is provided with a plurality of openings 23 that are spaced apart in a row extending parallel to the row of discharge apertures 13. The openings 23 are of a size, shape and spacing corresponding to the discharge apertures 13, and are movable into and out of registration with the openings 13 responsive to sliding movements of the gate plate 14 relative to the hopper bottom 7. A bracket 24 is secured to the gate plate 14, and is provided with a stud 25 on which is journaled a cam 26 that is releasably locked in any desired position of its rotation on the stud 25 by a wing nut 27 screwthreaded on the stud 25. The cam 26 engages an abutment in the nature of a flange 28 that projects laterally outwardly from the adjacent side wall portion 8, to limit movement of the gate plate 14 in a direction to bring the openings 23 into registration with the discharge apertures 13. Rotary adjustment of the cam 26 controls the amount of registration between the openings 23 and apertures 13 between a minimum registration therebetween and full registration. The gate plate 14 is moved from the right to the left with respect to FIG. 1 to bring the openings 23 and apertures 13 into registration, movement of the gate plate 14 in the opposite direction to its limit of movement completely shutting off flow of material from the interior of the hopper 1. Movement of the gate plate 14 from the left to the right with respect to FIG. 1 is limited by engagement of the right-hand end of the gate plate 14 with a stop lug or the like 29 suitably mounted on the hopper bottom 7.

A pair of bearing elements 30 are rigidly secured to the lower ends of the upper end walls 4 and 5, by means of nut-equipped bolts or the like 31. The bearing elements 30 form downward extensions of the end walls 4 and 5, and have aligned axes that are coaxial with the axis of the arcuate hopper bottom wall 7. The bearings 30 are cylindrical in shape, and are provided with radially outwardly projecting circumferential flanges 32 having inner surfaces which abut the adjacent ends of the bottom wall 7 and the lower ends of the wall portions 8 and 9 and end walls 4 and 5. Preferably, the bottoms of the end walls 4 and 5 are arcuate in shape, engaging the upper circumferential surface portions of the bearing elements 30.

The feeding rotor of this invention, illustrated in FIGS. 1–6, is shown as comprising an elongated axial shaft 33 and an elongated body member 34 mounted fast on the shaft 33 concentric therewith. The shaft 33 is shown as including an elongated central portion 35 of polygonal cross-section. For the purpose of the present example, the central portion is shown as being cross-sectionally pentagonal. The shaft 33 further includes axially extended opposite end portions or trunnions 36, each of which is journaled in a different one of the bearings 30 and extending axially outwardly therefrom. Either of the end portions or trunnions 33 may be assumed to be connected to means for imparting rotation to the shaft 33 and body member 34, said means not being shown. The shaft portion 35 has longitudinally extended plane surfaces 37 which cooperate to define longitudinally extended longitudinal corner edges 38. The body member 34 is preferably molded on the shaft central portion 35 and anchored thereto, and includes an axially extended hub portion 39, a pair of opposite end flange portions 40 and a plurality of circumferentially spaced vanes 41 projecting radially outwardly from the hub portion 39 and extending longitudinally between the end flange portions 40. Each of the vanes 41 projects radially outwardly from a different one of the corner edges 38, and is formed to provide opposite generally flat sides 42 that converge radially outwardly to a substantially feather edge 43. The radial dimension of each vane 41 from the axis of the shaft 33 is substantially equal to the radius of each of the end flange portions 40, as shown in FIGS. 3 and 4. The feather edges 43 are not necessarily sharp in the manner of a knife blade or the like, but have a dimension circumferentially of the feeding rotor in the neighborhood of 0.020 to 0.045 inches; and preferably such dimension is approximately one thirty-second of one inch. The hub portion 39 has flat outer surfaces 44 between adjacent vanes 41, each surface 44 cooperating with adjacent vane surfaces 42 and the end flange portions 40 to define elongated pockets 45 for reception of granular material to be dispensed from the hopper 1. Granules within the hopper are shown in FIGS. 4 and 5, and indicated at 46. The granules 46 may be in the nature of seeds, fertilizer, or chemical pesticides.

The vanes 41 are integrally molded with the hub portion 39 and flange portions 40 of relatively soft elastomeric material, such as rubber. The opposite sides or faces 42 of each vane 41 are disposed at an acute angle to each other. Depending upon the diameter of the feeding rotor and the number of vanes 41 thereof, the included angle defined by the opposite sides or faces of each vane may lie within a range of between 25 and 45° of circular arc. In the feeding rotor illustrated, having five vanes 41, the included angle between the opposite sides 42 measures substantially 36° of circular arc. After long and extensive experimentation, I have found that a rubber-like rotor body member having a hardness of between 15 and 50 durometer measurement, and the vanes 41 of which have the general shape and dimensional characteristics above described, has sufficient firmness to properly and uniformly feed the granules 46 disposed in the hopper 1 above the feeding rotor. The rotor body member has a preferred rubber hardness of 25 by durometer hardness measurement. The radially outer, substantially feather-edged, portions of the vanes 41, are sufficiently soft to yield when one or more granules 46 are caught therebetween and the adjacent inner surface of the arcuate hopper bottom wall 7, so as to be deformed around the caught granules. Such deformation of the feather-edged portions follows the contour or shape of each caught granule sufficiently closely that other granules cannot pass from one side of the deformed vane to the other side thereof adjacent the caught granule. Further, as particularly shown in FIG. 6, vane 41 has a longitudinal flexibility which permits it to assume a sinuous shape when engaging granules during operation. In other words, each vane of the rotor of my invention can accommodate to varying forces along its longitudinal length as compared to prior art rubber rotors; and it is believed that this is an important factor both in preventing crushing of the granules and in cutting down the opening or space around a granule when a vane passes thereover. The varying force along the longitudinal length of a vane of the rotor is believed to be a result of the fact that there is a variety of sizes of granules in front of the vane; the size varying from powder to relatively large-sized particles. It is believed that the lateral distortion of the vane along its longitudinal extent is proportional to the size of the granule or granules in front of the vane. Thus, when rotation of the rotor is stopped for any reason, the vane provides a seal against downward flow of granules from the hopper above the feeding rotor to the discharge apertures 13, even though one or more granules are caught between the feather edge of the vane and the inner surface of the hopper bottom wall 7. The resilience of each vane 41 is such that, during rotation of the rotor, pressure of the rotor vane on granules caught, as above mentioned, is not sufficient to fracture or crush the granules, but is sufficient to cause the granules to be moved by the vanes in sliding engagement with the inner surface of the hopper bottom wall 7 to the discharge aperture 13. It will be appreciated that, with each vane being cross-sectionally radially tapered, pressure of the outer feather-edged portion thereof against relatively smaller caught granules is relatively low, and that resistance to sliding feeding movement against the inner surface of the bottom wall 7 is correspondingly low. When feeding relatively larger or coarser granules, the resistance thereof to sliding engagement with the inner hopper bottom wall surface is usually correspondingly greater. However, due to the above-mentioned radial taper of each vane, resistance to bending thereof increases toward the axis of the feeding rotor. Thus, the vane engaging a larger granule caught therebetween and the bottom wall 7 exerts correspondingly greater generally radial pressure against the caught granule or granules to slidingly move the same on said inner surface of the wall 7 toward the discharge apertures 13. Although the above-mentioned pressure against relatively larger caught granules is greater than against relatively smaller granules, said pressure is not sufficient to fracture or crush the larger granules against the bottom wall 7. Preferably, the feeding rotor is so disposed within the hopper 1, so that a small running clearance is maintained between the inner surface of the arcuate hopper bottom wall 7 and the outer edges 43 of the vanes 41 and marginal edges of the end flanges 40. This running clearance is substantially less than the diameter of the granules 46 in present day use such as a 30–60 mesh, so as to avoid improper feeding or metering of the granules to the discharge apertures 13. By maintaining a small running clearance between the feeding rotor and the arcuate bottom wall 7, wear of the feather edges 43 and marginal edges of the end flanges 40 is substantially eliminated.

Preferably, the spacing of the vanes 41 circumferentially of the feeding rotor, and the included angle between the side wall portions 8 and 9, are such that in any given position of rotation of the feeding rotor, the apertures 13 are substantially sealed from the portion of the hopper 1 above the feeding rotor. Thus, when rotation of the feeding rotor is stopped, only the granules 46 disposed between the feeding rotor and the arcuate bottom portion 7 of the hopper escape through the apertures 13 and openings 23.

In the modified form of feeding rotor illustrated in FIG. 7, an elongated body member 48 is shown as being molded on a cross-sectionally round axial shaft 49. With the exception of its being mounted on a round shaft 49, the body member 48 is substantially identical to the body member 34, portions of the body member 48 corresponding to like portions of the body member 34 being identified by like reference numerals with prime marks added. Both body members 34 and 48 are anchored to their respective shafts 33 and 49 by being molded thereon and with suitable adhesives therebetween, to insure against separation of the body members from their respective shafts during operation thereof.

The above described feeding rotors have been thoroughly tested and have been found to enable the efficient dispensing of various granular chemicals, fertilizer, herbicides and insecticides, grass seeds and cereal crop seeds without fracture of the granules and subsequent material buildup, corrosion and wear. Further, my improved feeding rotor has been found to be highly beneficial in the sowing of fragile seed with a minimum of seed fracture and attrition within the dispensing hopper.

What is claimed is:

1. A feeding rotor for a machine for spreading granular material including a dispensing hopper having an elongated cross-sectionally arcuate bottom portion and discharge aperture means in said bottom portion; said feeding rotor comprising an elongated rigid shaft adapted to be journaled in said hopper parallel to and adjacent said arcuate bottom portion and an elongated body member of elastomeric material mounted fast on said shaft concentric therewith; said body member comprising a plurality of circumferentially spaced generally radial vanes extending longitudinally of the shaft; said vanes each having opposite sides converging generally radially outwardly and defining an outer longitudinally extending feather edge; the sides of each vane cooperating with sides of adjacent vanes to define opposite side wall surfaces of radially outwardly opening granular material receiving pockets; said feather edges being of such flexibility as to enable the edges to flex generally radially and circumferentially responsive to pressure of a granule caught therebetween and the inner surface of the hopper bottom, and to require pressure of material in a compartment rearwardly thereof with respect to the direction of rotation of the rotor to be supported against excessive circumferential flexing during feeding rotation of the rotor, so as to effectively feed granular material to said discharge aperture means.

2. The feeding rotor defined in claim 1 in which said feather edge has a thickness dimension of substantially one thirty-second of one inch in a direction circumferentially of the rotor.

3. The feeding rotor defined in claim 1 in which said body member is of a hardness between 15 and 50 durometer measurement.

4. The feeding rotor defined in claim 1 in which said body member includes a pair of generally radially outwardly projecting circumferential flanges defining the opposite ends of said body member, said flanges being integral with said vanes and each having a radius substantially equal to the radius of said vanes.

5. The feeding rotor defined in claim 3 in which said feather edge has a thickness dimension of substantially one thirty-second of one inch in a direction circumferentially of the rotor, said body member having a hardness of between 15 and 50 durometer measurement.

6. In a machine for spreading granular materials; a dispensing hopper having an elongated cross-sectional arcuate bottom portion and longitudinal discharge aperture means in said bottom portion; and a feeding rotor journalled in said hopper coaxially with said bottom portion and closely overlying said discharge aperture means; said feeding rotor comprising an elongated rigid shaft and an elongated body member of elastomeric material mounted fast on said shaft concentric therewith; said body member comprising a plurality of circumferentially spaced generally radial vanes extending longitudinally of the shaft; said vanes each having opposite sides converging generally radially outwardly and defining an outer longitudinally extending feather edge; the sides of each vane cooperating with sides of adjacent vanes to define opposite side wall surfaces of radially outwardly opening granular material receiving pockets; said feather edges being of such flexibility as to enable the edges to flex generally radially and circumferentially responsive to pressure of a granule caught therebetween and the inner surface of the hopper bottom, and to require pressure of material in a compartment rearwardly thereof with respect to the direction of rotation of the rotor to be supported against excessive circumferential flexing during feeding rotation of the rotor, so as to effectively feed granular material to said discharge aperture means.

7. The machine defined in claim 6 in which said feather edge has a thickness dimension of substantially one thirty-second of one inch in a direction circumferentially of the rotor.

8. The machine defined in claim 6, in which said body member is of a hardness between 15 and 50 durometer measurement.

9. The machine defined in claim 6, in which said body member includes a pair of generally radially outwardly projecting circumferential flanges defining the opposite ends of said body member, said flanges being integral with said vanes and each having a radius substantially equal to the radius of said vanes.

10. The machine defined in claim 6, in which said dispensing hopper includes upwardly diverging side wall portions tangent to said arcuate bottom portion, the vanes of said rotor being at least five in number.

11. The machine defined in claim 6, in which said rotor body member is molded on said rotor shaft.

* * * * *